United States Patent
Murdock et al.

(10) Patent No.: US 11,741,406 B2
(45) Date of Patent: Aug. 29, 2023

(54) LOCATION-BASED TASK SUGGESTIONS

(71) Applicant: Microsoft Technology Licensing, LLC, Redmond, WA (US)

(72) Inventors: Vanessa Murdock, Seattle, WA (US); Russell Allen Herring, Jr., Redmond, WA (US); Nirupama Chandrasekaran, Redmond, WA (US); Robert A Sim, Bellevue, WA (US); Ryen W. White, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/885,624

(22) Filed: Jan. 31, 2018

(65) Prior Publication Data
US 2019/0236515 A1 Aug. 1, 2019

(51) Int. Cl.
*G06Q 10/0631* (2023.01)
*G08B 21/24* (2006.01)
(Continued)

(52) U.S. Cl.
CPC ..... *G06Q 10/063114* (2013.01); *G06Q 10/00* (2013.01); *G06Q 10/06* (2013.01);
(Continued)

(58) Field of Classification Search
CPC ............................................. G06Q 10/063114
See application file for complete search history.

(56) References Cited

U.S. PATENT DOCUMENTS

2007/0005419 A1 1/2007 Horvitz et al.
2010/0004005 A1* 1/2010 Pereira .................. H04W 4/029
455/457
(Continued)

FOREIGN PATENT DOCUMENTS

CN 104011504 A 8/2014

OTHER PUBLICATIONS

Gil et al, Social Task Networks: Personal and Collaborative Task Formulation and Management in Social Networking Sites, Proactive Assistant Agents: Papers from the AAAI Fall Symposium (FS-10-07), pp. 9-13 (Year: 2010).*
(Continued)

*Primary Examiner* — Andre D Boyce
(74) *Attorney, Agent, or Firm* — Shook, Hardy & Bacon, L.L.P.

(57) ABSTRACT

Systems and methods can be implemented to provide suggestions to a user device to execute user tasks in a variety of applications. In various embodiments, a set of tasks of a user from a number of task sources are identified for possible consolidation. The tasks in the set can be analyzed to identify a location to accomplish the tasks, estimate times to complete the tasks at the identified locations, and compute routes to the locations from a starting location or compute routes with respect to a route to another location of another task of the set of tasks. The identified locations, the estimated times, and the computed routes can be used to determine which tasks of the set of tasks are available for consolidation. One or more suggestions of task consolidations can be generated to or within the user device. Additional systems and methods are disclosed.

20 Claims, 5 Drawing Sheets

(51) Int. Cl.
*G06Q 10/1093* (2023.01)
*G06Q 10/10* (2023.01)
*G06Q 10/06* (2023.01)
*G06Q 10/00* (2023.01)
*G06F 3/0482* (2013.01)
*G06N 20/00* (2019.01)

(52) U.S. Cl.
CPC ......... *G06Q 10/10* (2013.01); *G06Q 10/1093* (2013.01); *G06Q 10/1097* (2013.01); *G08B 21/24* (2013.01); *G06F 3/0482* (2013.01); *G06N 20/00* (2019.01)

(56) References Cited

U.S. PATENT DOCUMENTS

| | | | |
|---|---|---|---|
| 2010/0004857 A1* | 1/2010 | Pereira | G01C 21/00 701/533 |
| 2012/0059580 A1 | 3/2012 | Coughlin et al. | |
| 2012/0239451 A1* | 9/2012 | Caligor | G06Q 10/00 705/7.21 |
| 2012/0253660 A1* | 10/2012 | Dillahunt | G01C 21/3415 701/423 |
| 2012/0278388 A1* | 11/2012 | Kleinbart | G06Q 10/06 709/204 |
| 2012/0313777 A1* | 12/2012 | Zazula | G06Q 10/109 340/539.13 |
| 2015/0095268 A1* | 4/2015 | Greenzeiger | G06Q 10/06311 706/11 |
| 2015/0161553 A1* | 6/2015 | Eggleston | G06Q 10/063114 705/7.15 |
| 2015/0186530 A1 | 7/2015 | Mansour et al. | |
| 2015/0317582 A1* | 11/2015 | Nath | G06Q 10/06 705/7.13 |
| 2016/0247105 A1* | 8/2016 | Vaze | H04W 4/029 |
| 2016/0350691 A1* | 12/2016 | Davis | G06Q 10/06395 |
| 2017/0004396 A1 | 1/2017 | Ghotbi et al. | |
| 2019/0034948 A1* | 1/2019 | Falor | G06Q 30/0208 |

OTHER PUBLICATIONS

Raquel Benbunan-Fich et al, Measuring Multitasking Behavior with Activity-Based Metrics, ACM Transactions on Computer-Human Interaction, vol. 18, No. 2, Article 7, Publication date: Jun. 2011, p. 7:1-7:22 (Year: 2011).*

Mansour, et al., "Augmenting Business Entities with Salient Terms from Twitter", In Proceedings of 25th International Conference on Computational Linguistics: Technical Papers, Aug. 23, 2014, pp. 121-129.

"International Search Report and Written Opinion Issued in PCT Application No. PCT/US2019/012799", dated Apr. 5, 2019, 12 Pages.

"Office Action Issued in Chinese Patent Application No. 201980011013. X", dated Mar. 8, 2023, 9 Pages.

* cited by examiner

ITINERARY FOR TASK 1 ON DATE

| LEAVE TIME | STARTING LOCATION | DESTINATION | ESTIMATED TIME OF ARRIVAL | TASK |
|---|---|---|---|---|
| X:xx | WORK | LOCATION 1 | Y:yy | TASK 2 |
| S:ss | LOCATION 1 | LOCATION 2 | Z:zz | TASK 3 |
| P:pp | LOCATION 2 | LOCATION 3 | Q:qq | TASK 4 |
| M:mm | LOCATION 3 | LOCATION 4 | N:nn | TASK 1 |
| R:rr | LOCATION 4 | HOME | H:hh | |

*212*

FIG. 2

LOCATION-BASED TASK SUGGESTIONS

TECHNICAL FIELD

Embodiments described herein generally relate to methods and systems related to electronic tools for individuals.

BACKGROUND

Individuals may have a number of tasks to be completed over a period of time. It is common for an individual to note in an electronic device the tasks that the individual intends to accomplish. These tasks can include commitments with respect to work, commitments with respect to other individuals, personal tasks to complete, and other tasks to be accomplished over a period of time. These pending tasks can be noted in a user electronic device as part of a user's to-do list, calendar entry, commitments made in an email, or requests received in communications with other users. Enhancements in capabilities for the user's electronic device can help the user to be more productive in accomplishing the user's tasks.

BRIEF DESCRIPTION OF THE DRAWINGS

FIG. 2 is a representation of an example display on a user device showing consolidated tasks of the user, in accordance with various embodiments.

DETAILED DESCRIPTION

Figure 1:
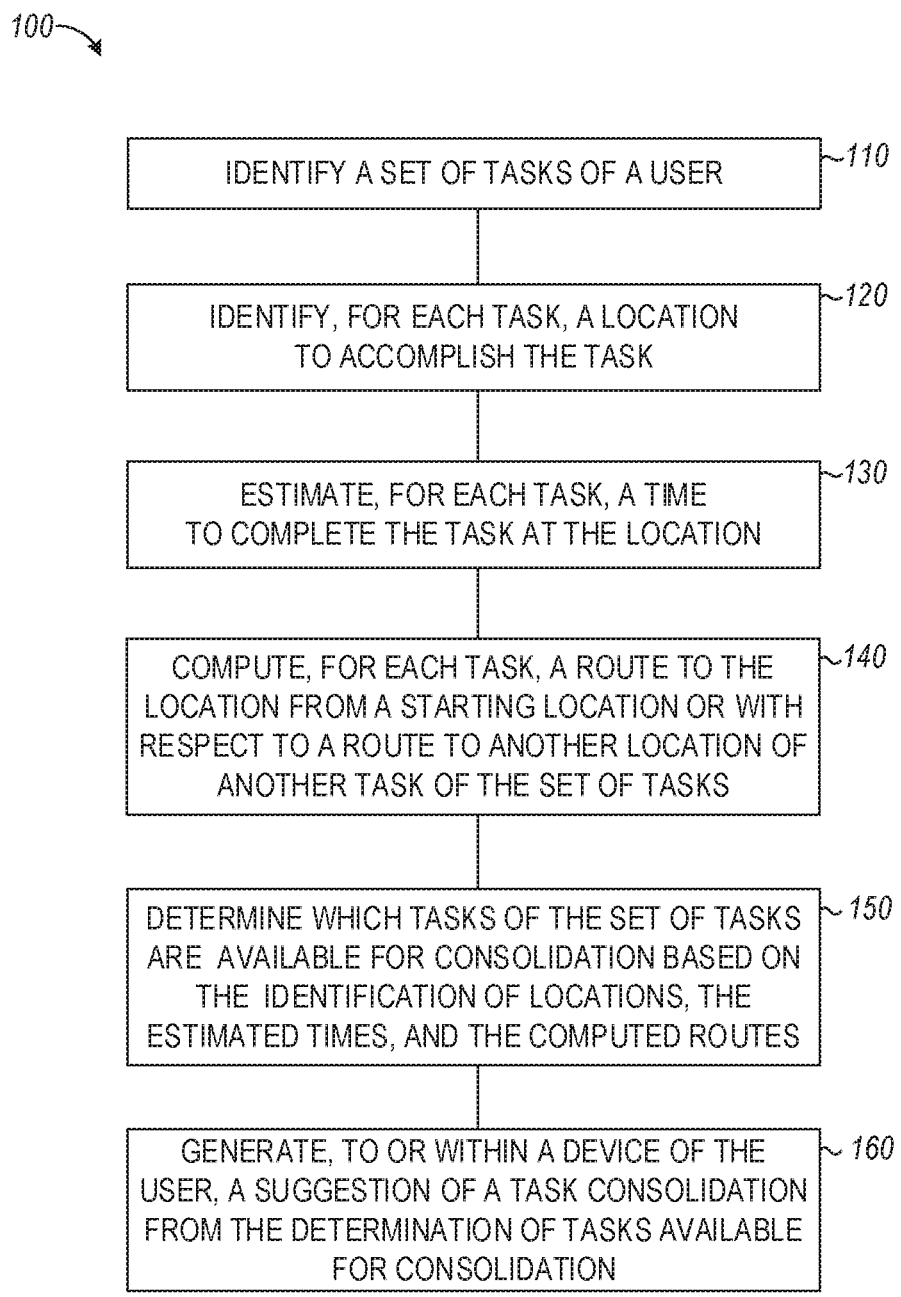
FIG. 1 is a flow diagram of features of an example method of task management using location-based task suggestions, in accordance with various embodiments.

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, mechanical, and electrical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, capabilities can be provided to a user's electronic device, which help the user of the electronic device to be more productive by alerting the user when it is possible to consolidate tasks. Consolidating tasks can include, but is not limited to, consolidating a number of tasks into a single trip. Such capabilities can include identifying pending tasks and alerting the user when one or more pending tasks can be accomplished en route to another location for performing another task. These pending tasks may include items from a user's to-do list on an electronic device of the user, a calendar entry on the electronic device, an e-mail in the electronic device, or a user-related item accessible by the electronic device. If a user has a number of electronic devices that can be interfaced or synced, pending tasks listed in different ones of the electronic devices can be analyzed for possible consolidation. Such tasks may include travel to a destination.

Electronic consumer map applications often include a capability to route to a destination from a starting location such as a current location or other selected location and an estimate of the time to drive to the destination from the current location or from the other selected location. Some of the consumer map applications may also offer a time-to-leave feature, which alerts the user as to when the user needs to leave a known starting location to be at the destination at a particular time. The particular time may be the time for an appointment time or a meeting time or other time.

A procedure, as taught herein, can include, for example, identification of tasks from a user's to-do list or commitments made in email by the user, and a notification to a device of the user, using features associated with operations that may include route determination, time estimate for travel to multiple locations, time to perform a task at a location during the en route travel, and other task and location parameters. The notification alerts the user when an item can be accomplished en route to a location of another task. For example, consider a user having a doctor's appointment across town and also having a task to pick up cleaning supplies. A procedure, as taught herein, includes a feature that identifies a store near the doctor's office that sells cleaning supplies and suggests to the user that the user can add 15 minutes, for example, to the user's trip prior to the appointment, or 20 minutes, for example, after the appointment to pick up the cleaning supplies. The procedure can also display a new route that includes both the doctor's office and the purchase point of the cleaning supplies, where the time adjustments for the new route can also be displayed. However, if the user's calendar shows that the user cannot spare the additional 15-20 minutes, e.g., due to appointments adjacent to the doctor's appointment, the procedure may decline to make the suggestion, preferring not to distract the user with suggestions the user cannot act on, which may add more stress to the user's day.

FIG. 1 is a flow diagram of features of an embodiment of an example method 100 of task management using location-based task suggestions. The features can be conducted based on execution of instructions by one or more processors. The one or more processors may be components of a system having an application to manage tasks including location-based task suggestions for task consolidation. At 110, a set of tasks of a user from a number of task sources is identified. The task sources can be disposed in one or more devices of the user or in one or more databases accessible by a task manager. The task sources can be disposed in one or more cloud storages. Instructions to operate as a task manager can control communications to the one or more devices, external data sources, and other devices that include data to generate location-based task suggestions for task consolidation. The number of task sources can include, but is not limited to, to-do lists in the one or more electronic devices, calendars in the one or more electronic devices, e-mails in the one or more electronic devices, and other notation mechanisms available to the user in the one or more electronic devices. The tasks may be accessed via cloud service providers. The one or more electronic devices can include mobile telephones, electronic tablets, laptops, and other devices of the user.

The tasks in the number of task sources may include tasks having specific times and dates for execution such as appointments, tasks having specific dates for execution but not at specific times, tasks without specific times and dates, and other tasks. Identifying the set of tasks of the user can include identifying a target task about which to determine which tasks of the set of tasks are available for consolidation. Identifying the target task can be based on the target task having a defined time for execution.

One or more sets of tasks from the totality of tasks number can be generated for determination of tasks that can be consolidated. The process of generating these tasks can include limiting one or more tasks from being in the same set of tasks. For example, two tasks having specific time and day parameters may be restricted from being in the same set if the two tasks are scheduled to be performed on different days. Sets of tasks may be generated based on the day for execution. Each set for a particular day can include tasks that are not specifically tied to a day. These tasks that are not specifically tied to a day can be part of each day specific set for evaluation of task consolidation.

At 120, for each task in the set, a location at which to accomplish the task is identified. Locating the tasks can include using locations that are explicitly indicated by a task source, for example, locations notated with a calendar event for the task. To determine whether one or more tasks in a set can be consolidated, one or more locations for accomplishing the task can be determined. This determination of location can be performed using a search engine based on text in the task sources that describes the task. From the task description, a type of venue for performing the task can be determined. The type of venue for performing the task may be determined using a search engine based on the task description. The correlation of the description of the task in the task source to a type of venue may be performed using a learning machine or a process similar to a learning machine. Depending on the task, the venue may be a business entity, Part of determining a location includes identifying a business entity or other venue where a task can be accomplished. Individual businesses are associated with a category or type that can be stored in a data source such as a repository of businesses. For example, McDonald's can be classified as a restaurant, and can be further classified as a fast-food restaurant and an American restaurant. These classifications can be stored in a data source, such as a database, for access by a task manager to generate one or more suggestion to a user device for task consolidation.

A source for classification can include a consumer Internet search engine, which has local licenses with businesses to collect such data including the business location and which aggregates data regarding the businesses from multiple sources. In addition, businesses can be categorized based on user interactions or user interests, either via query behavior or social media check-ins. See, for example, U.S. patent application Ser. No. 14/144,213, published as U.S. Patent Publication 2015/0186530, which is further described in Mansour et al. "Augmenting Business Entities with Salient Terms from Twitter" *Proceedings of COLING* 2014, pg. 121-129. With respect to recommending a location, see U.S. patent application Ser. No. 11/171,940, "Recommending Location and services via Geospatial Collaborative Filtering," published as U.S. Patent Publication 2007/0005419. Both of these patent applications rely on data from multiple similar users. In the case of U.S. patent application Ser. No. 14/144,213, social media status updates at a given location are used to extract salient terms. In the case of U.S. patent application Ser. No. 11/171,940, a collaborative filtering approach is taken to recommend places or services visited by similar users.

In various embodiments, a different approach is taken, which difference includes matching tasks to locations, personalized to a given user. More specifically, a content-based approach is used rather than a collaborative filtering approach. As taught herein, a system can help manage tasks of a device user employing location-based task suggestions, which provide a mechanism to consolidate individual user tasks. The system is not dependent on social media, and tasks of a user can have a richer representation of user intent than key words by examining a variety of tasks, historical data regarding these tasks, and historical data of patterns of task completions by the specific user.

At 130, for each task in the set, a time to complete the task at the location is estimated. A feature of task consolidation is based on time. A user has an amount of time available in any given day to perform tasks. To determine if tasks can be consolidated into a single multi-element task, a determination is made as to the time to complete the task at its respective location. Combinations of the times for task completions for the tasks in set of tasks can be compared to an allotted time. These combinations can include considering task completion at different locations for the same task, in the event that completion of the particular task at some locations may take a different amount of time than completing the same task at another location, without including travel time to the different locations.

Task completion time can be estimated from log data indicating how long a typical user spends at a location, which can be determined from stored data. Live data may also be evaluated using map applications that show how busy a particular location is in real time or near-real time. This estimate can be refined with personalization, using logged data of a specific user's activities. The time to complete the task at the location can include estimating completion from historical data of typical users in a surrounding area and adding a padding time based on historical data of the given user. The historical data of typical users can be collected by accessing a database over a network. For example, for a particular area from which people may go to see their doctors, historical data may provide a time to complete the visit, but from historical data of the current user it can be determined that particular doctor is late to begin the appointment on more than a rare basis. In this case, a small amount of time can be added to the statistical time to complete a doctor's appointment.

In initiating the application to manage tasks including location-based task suggestions for task consolidation, the user can access a user interface (UI) of a device of the user to set parameters and accept agreements with services to collect data. Via the UI, the user can terminate such agreements. A parameter controllable by the user via the UI is selective control of the application to manage tasks. The user can select to have the application run continuously or turn off the application at any chosen time.

At 140, for each task in the set, a route to the location from a starting location or a route with respect to a route to another location of another task of the set of tasks is computed. Route planning can include optimizing an objective function such as travel time. This may include consideration of inter-task dependencies in the optimization. For task consolidation, combining one or more tasks may include travel to locations that are not along the same route from a selected starting location. In such cases, evaluating task consolidation includes computing the route to the additional locations that are involved in performing more than one task. Route computation includes time to travel the route, which time can take into account traffic conditions for different times of the day and weather conditions. Route computation is already part of most consumer map applications and the same techniques may be used herein. For example, a similar application is included in the system for generating location-based task suggestions with additional components that estimate whether it is optimal to calculate the routes to the one or more additional locations from the origin or with respect to the original destination. These calculations can include permutations of using different tasks in the set to determine the complete route for task consolidation. These additional components consider a combination of factors including traffic conditions, travel time, and adjacent appointments in a calendar of a user's device.

In calculating various routes about tasks in the set of tasks for a particular task consolidation evaluation, one of the tasks for the particular day can be taken as a target task about which evaluation of different routes in combining tasks is conducted. Identifying the set of tasks to evaluate for consolidation can include initially identifying the target task followed by identifying other tasks for the set and, for each of the other tasks of the set, identifying the location to accomplish each of the other tasks and computing the route to the location to accomplish each of the other tasks based on the target task.

At 150, a determination is made as to which tasks of the set of tasks are available for consolidation based on the identified locations, the estimated times, and the computed routes. The determination based on the identification of locations, the estimated times, and the computed routes can include computation of execution times, travel times, and other associated times for different combinations of tasks in the set of tasks. These computations can be compared to generate one or more possible suggestions of task consolidation, where each suggestion consolidates different tasks of the set of tasks or has a different order of task performance or routes for tasks in the suggested consolidation. In generating the suggestions, a time threshold, a distance, or combination of time and distances can be used to limit the number of suggestions. Times of combination of tasks that exceed a time threshold can be discarded as a possible suggested consolidation. Distances to travel to execute a combination of tasks that exceed a distance threshold can be discarded as a possible suggested consolidation. The distance threshold can be based on the user's pattern of using resources, such as consuming gasoline, in accomplishing tasks. For example, if the user's pattern shows that previous task completions have incurred within a range of distances, the threshold can be the largest distance. These thresholds can be set by evaluation of historical data using statistics regarding this data by a training routine of the application managing the user tasks. However, data associated with the rejected combination of tasks can be stored in database to provide data for further training of a task manager that generates suggestions for different consolidations of tasks. The further training can include adjustment of the thresholds.

In various embodiments, the determination of which tasks can be consolidated can include computing the additional time for accomplishing a task listed in a device of the user, where the listed task is adjacent in a to-do list or adjacent in time on a calendar to the original target appointment, based on additional travel time, task completion time, and other factors such as other events on the user's calendar. Task completion time can be estimated from log data indicating how long a typical user spends at a location, which can be determined from stored data. This estimate can be refined with personalization, using logged data of a specific user's activities.

In addition, if a venue is not currently represented in the system for generating location-based task suggestions, an estimate from similar locations can be used to bootstrap the time to complete a task at the venue location corresponding to the respective task. For a system for generating location-based task suggestions that is implemented as a service for multiple users, as the system gathers data via the users of the service, the time to complete tasks at a venue can be updated to reflect the statistics of all users, or personalized to a given user. Whether arranged as a service for multiple users or as a system for a given user, a content-based approach can be used in the architecture and operation of the system rather than a collaborative filtering approach. Such systems can operate on tasks that have a more complex data type than locations and services, although such tasks may include both locations and services.

At 160 a suggestion of a task consolidation from the determination of tasks available for consolidation is generated. At 170, the suggestion is sent to or within a device of the one or more devices of the user. A user interface of the device can be structured to control presentation of the task consolidation to the user. The presentation of suggested task consolidations to the user can be generated on a display screen of the device.

FIG. 2 is a representation of an embodiment of an example display 212 on a user device showing consolidated tasks of the user. Display 212 shows an itinerary for a primary task on a given day. In this example, the primary task on the given day is task 1 scheduled to be undertaken after work. The itinerary shows three additional tasks to complete with task 1 on the way from work to home. As shown, the route proceeds from work to location 1 to location 2 to location 3 to location 4, and then home from location 4. At each of locations 1-4, the user can perform the listed task on display 212. The leave times after the first time, X:xx, can be calculated as the estimated time of arrival plus estimated time to complete the task at the respective location. In this example, the initial leave time can be estimated as the normal time to leave work, which may be determined from historical data on user activities, or based on the time for performance of task 1 at location 4 such as for an appointment.

The presentation of suggested task consolidations to the user can be generated by audio speakers of the device. Sending the suggestion of the task consolidation can include generating an alert in the device in real time in response to a task being created in the device or an associated device of the user, or generating a proposed itinerary for a consolidation at a selected time prior to performing any of the tasks in the consolidation, or generating an alert of the consolidation en route to performing one of the tasks of the consolidation. Itinerary calculation can include optimizing an objective function. Inter-task dependencies may be considered in the optimization.

Upon notification of one or more task consolidations via a user interface, a user can reject the task consolidation using the user interface. Upon user prompt to not accept the task consolidation, the user interface generates a signal to the task manager that generated the rejected task consolidation, where the signal provides information regarding the rejection. The information can be a simple no or may include rejections of some of the tasks in the suggested task consolidation and acceptance of other tasks in the suggested task consolidation. The partial acceptance of tasks can be realized in prompts for the user generated in the user interface.

Figure 3:
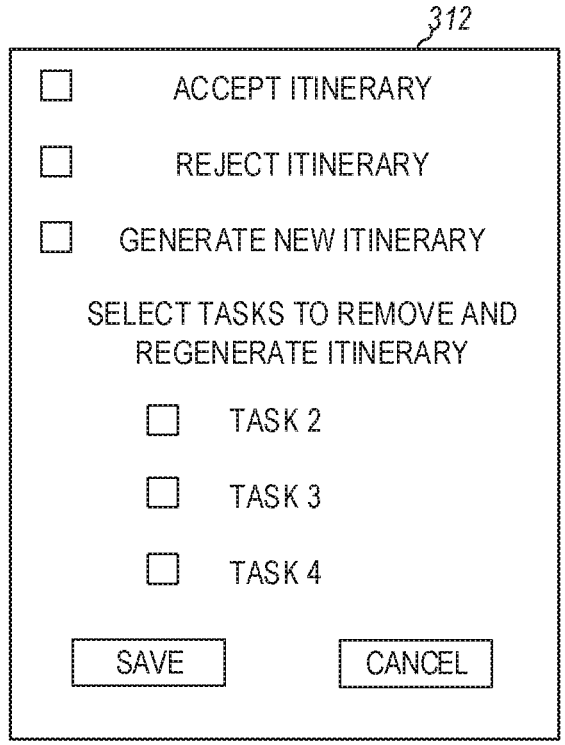
FIG. 3 is a representation of an example display on a user device in which a user can respond to a prompt regarding an itinerary previously presented on the user device, in accordance with various embodiments.

FIG. 3 is a representation of an embodiment of an example display 312 on a user device in which a user can respond to a prompt regarding an itinerary previously presented on the user device. The UI of the user device provides a set of actions from which a user can select using capabilities provided by the user device. The selection tool associated with the UI can include one or more of a touch screen mechanism, a cursor, or other mechanism to respond to the prompts for the user that were generated in display 312 by the UI. In this example, the user is presented with four choices: accept the itinerary, reject the itinerary, generate a new itinerary, or select tasks to remove and regenerative an itinerary with the remaining tasks that were presently presented. The user can select one of the actions to be taken and select the save icon to generate a response. Alternatively, the user can select the cancel icon. Activation of the cancel icon can be used to ignore the itinerary at the present time.

If the task manager receives a complete rejection of the combination of tasks, the task manger may generate in real time another task consolidation. Alternatively, no additional suggestions may be made, for example, the system may have a limit on the number of suggestions proposed per task or particular unit of time (e.g., 1/day). In addition, data regarding rejections can be stored for further analytical correlations regarding the nature of these tasks including correlations between the type of tasks, starting locations, individual task locations, routines, and other data associated with the rejected task consolidation. A number of prompts to and from the user interface of the user's device can be generated, in response to task rejections, to collect data for storage in a database for future use in the generation of suggested task consolidations.

In addition, suggestions can be generated to perform one or more tasks that are tasks without specific times and dates, based on the tracked current user location or from a pattern of user activities determined from tracking the location of the user. For example, consider a user currently at a work location and having a number of tasks on a to-do list for which near-by locations have been identified as locations to accomplish these tasks by a task manager associated with one or more of the devices of the user. A notification for the user can be generated identifying specific local locations to accomplish the respective tasks, the times of operation of these specific local locations, and possible times to perform these tasks. These possible times can include times for lunch and times to leave work based on patterns of activities that are attributed to lunch and end of the work date learned data collected from tracking one or more user devices. For such a notification, route analysis may be by-passed.

Variations of method 100, shown in FIG. 1, or methods similar to method 100 can include a number of different embodiments that may be combined depending on the application of such methods and/or the architecture of systems in which such methods are implemented. Such methods can include determining a time range during which to send the suggestion of a task consolidation to or within the device. Determining when to alert the user to the opportunity to consolidate their tasks provides the user with the ability to make preparations for the consolidated tasks. For example, if the user has activities to perform to prepare for the task beforehand, for example gathering together dry-cleaning or writing down a shopping list, the alert can be sent the day before. Depending on the location of the user, as tracked by a user device, and the time of day, the alert can be sent, in the same day, at an amount of time before executing the task. For the example of gathering together dry-cleaning or writing down a shopping list, with the user located at home on a non-work day, the alert can be sent in the morning for task execution in the afternoon. Determining a time range during which to send the suggestion of a task consolidation to or within the device can include factors such as activity preparation for the tasks, user current location, user expected location prior to the time attributed for task completion, day of the week relative to the user's work schedule in addition to previously determined times such as time for task completion and time for travel.

Variations of method 100, shown in FIG. 1, or methods similar to method 100 can include changing a stored state of a task in the suggested task consolidation in response to an indication of acceptance of the suggestion and data indicating actions taken with respect to the suggested task consolidation. Changing the state of pending tasks to completed can be based on location tracking of the user via one or more user devices, time spent at the additional venues for tasks consolidation with a target task, and other location-based and user signals. A user may change the status of user tasks via a user interface. In addition, for a system for generating location-based task suggestions that is implemented as a service for multiple users, models of task completion time at a respective location can be updated based on detected time spent there by the current user for personalization of the system, by cohorts of users, or by the general population of users. Method 100 or methods similar to method 100 can include performing functions of components of architecture 400 of FIG. 4 or components similar to components of architecture.

Figure 4:
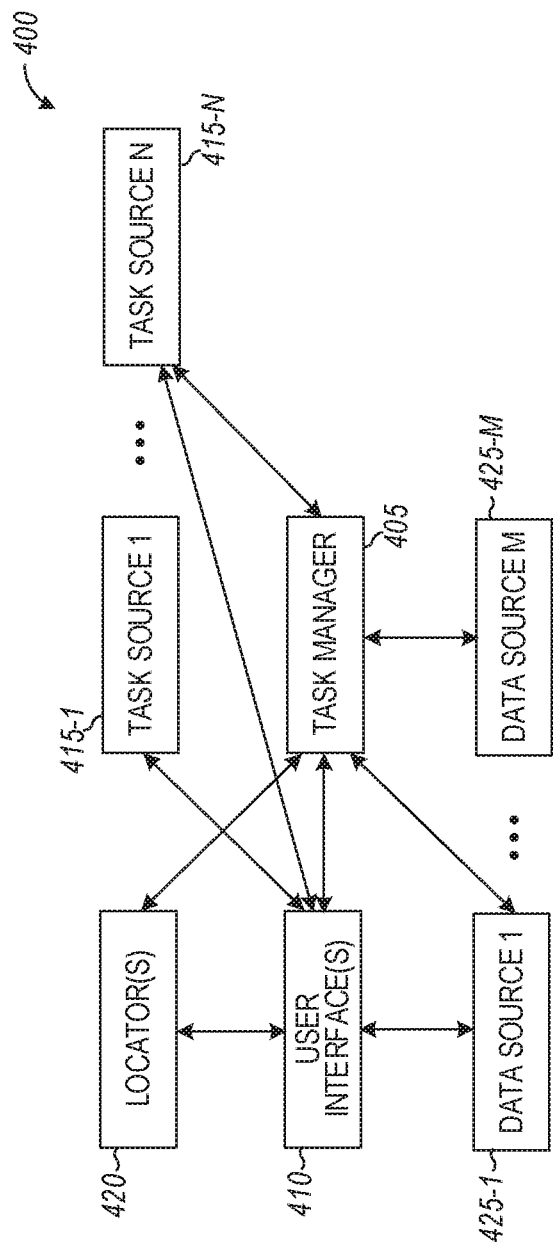
FIG. 4 is a block diagram of features of an example architecture of components to provide location-based task suggestions to a user device, in accordance with various embodiments.

FIG. 4 is a block diagram of features of an embodiment of an example architecture 400 of components to provide location-based task suggestions to a user device. Architecture 400 is shown as an example of components for one or more devices of a given user. Architecture 400 can include a task manager 405 to analyze tasks for task consolidation and generate suggestions of consolidations to one or more of the devices of the user. Task manager 405 can be realized as set of instructions stored in a memory, which instructions are executed by a set of processors, and hardware to provide signals to one or more user interface(s) 410 associated with devices of a user and to communicate with a number of task sources 415-1 . . . 415-N and data sources 425-1 . . . 425-M. Task sources 415-1 . . . 415-N can be disposed in one or more devices of the user or in one or more databases accessible by a task manager 405. Task manager 405 can perform operations that can include operations to perform features of method 100 or methods similar to method 100.

Task manager 405 can be structured to perform operations that can include operations to identify a set of tasks of a user, associated with user interface(s) 410 from the number of task sources 415-1 . . . 415-N, and, for each task in the set, identify a location to accomplish the task; estimate a time to complete the task at the location; and compute a route to the location from a starting location or with respect to a route to another location of another task of the set of tasks. The operations can include operations to determine which tasks of the set of tasks are available for consolidation based on the identification of locations, the estimated times, and the computed routes; and to generate, to or within a device of the user, a suggestion of a task consolidation from the determination of tasks available for consolidation. Route planning can include optimizing an objective function such as travel time. This may include consideration of inter-task dependencies in the optimization. In various embodiments, the operations to generate a suggestion of a task consolidation can include operations to generate suggestions of multiple task consolidations and to prompt selection of at least one or none of the suggestions in a user interface of the device.

The operations to identify the set of tasks of the user can include operations to identify a target task about which to determine which tasks of the set of tasks are available for consolidation. Operations to identify the target task can be based on the target task having a defined time for execution. Operations to determine which tasks of the set of tasks are available for consolidation can include operations to reject tasks having a sum of both the time to complete and a time to travel the computed route that is greater than a time to complete the target task from a starting time or operations to reject tasks having a total time to complete the tasks that is greater than the total time available on a calendar.

The operations of task manager 405 can include operations to determine a time range during which to send the suggestion of a task consolidation to or within the device. The operations to determine the time range can include operations to determine characteristics of operations involved in tasks available for consolidation prior to beginning undertaking the tasks in the consolidation, based on statistical data from historical data on the operations involved in the tasks. The operations of task manager 405 to send the suggestion to or within the device can include operations to generate an alert in the device in real time in response to a task being created in the device or an associated device of the user, to generate a proposed itinerary for a consolidation at a selected time prior to performance of any of the tasks in the consolidation, or to generate an alert of the consolidation en route to performance of one of the tasks of the consolidation.

The operations of task manager 405 can include operations to change a stored state of a task in the suggested task consolidation in response to an indication of acceptance of the suggestion and data indicating actions taken with respect to the suggested task consolidation. The tasks may be stored in task manager 405 or in a number of databases such as data sources 425-1 . . . 425-M. The user by user interface 410 can input a change of status including, but not limited to, an indication of completion of the task, movement of the task to another day or time, reclassification of a priority indication for the task, and deletion of the task. User interface 410 may also interact with data sources 425-1 . . . 425-M, though not shown in FIG. 4.

Task manager 405 may be realized in a number of different arrangements. The set of processors and the set of storage devices of task manager 405 can be disposed in the device of the user. Communication interfaces of the device of the user can be utilized for task manager 405 to interact with any of task sources 415-1 . . . 415-N and data sources 425-1 . . . 425-M that are not integrated in the user device. Task manager 405 can include one or more bots to access data from knowledge sources and/or repositories of historical data. A bot is a program that can access web sites and gather content based on a provided search index. The web sites can be coupled to the Internet, an intranet, or the web sites may be databases, each database accessible by its own addresses according to a protocol for the respective database.

In an alternative embodiment, task manager 405 can be structured in a cloud architecture. Task sources 415-1 . . . 415-N can be disposed in one or more cloud storages. Typically, the term "cloud" with respect to data processing and communicating refers to a datacenter full of servers that is connected to the Internet. However, cloud may refer to any network or combinations of networks. A cloud can include a wide area network (WAN) like the public Internet or a private, national or global network, and may include a local area network (LAN) within an organization providing, the services of the datacenter. In addition, the term "cloud computing" refers to the software and services executed for users by these servers, and typically the user is unaware of the physical location of the servers or datacenter. Further, the datacenter may be a distributed entity. Cloud computing can provide shared computer processing resources and data to computers and other devices on demand over the associated networks.

Task manager 405 can be structured in an arrangement of a single user to function in a personalization format. Other arrangements can include task manager 405 as a service to multiple users. For task manager 405 in a service mode, data of individual users can be stored in data sources 425-1 . . . 425-M. In addition to this data being used to generate suggested task consolidations for individual users, the data of the individual users can be used by task manager 405 to provide historical data and statistics that can be used to determine time to complete tasks and time to travel routes for the multiple users.

Task manager 405 can access one or more locators 420 in the generation of suggestions for task consolidation. The one or more locators 420 can include a service in the electronic devices of the user to interface with a global positioning system (GPS) that can provide location and time of the electronic devices. The GPS features provided to task manager 405 can include data normally used by the user electronic devices for navigation purposes. The user, via the one or more user interfaces 410, can activate continual use of the GPS features and presentation of data to task manager 405 without further instructions from the user via user interfaces 410. In various embodiments, the user can selectively activate and turn off features provided by task manager 405 via user interfaces 410.

Task manager 405 can track journeys of the user via the journey of the devices of the user. Using locator(s) 420, data on locations at which the user stops and the time at such locations can be stored in one or more data sources 425-1 . . . 425-M. This stored location data provides historical data that can be used as statistics in analyzing compatibility of tasks for consolidation. The tracking data with its association between a given location and time at the given location can be used to provide data on task completion that can be stored. In tracking a user at a location, if the detected time is larger than a threshold value for completing a given task at the respective location, task manager 405 may record this event as a completed task. Task manager 405 may prompt the user via user interface 410 to verify that the given task is indeed completed. This prompt may be provided in real time or at the end of the consolidated tasks. In addition, having data on a current location of the user, task manager 405 can generate real time suggestions for further task consolidation, relative to the current status of the user, which takes into account the current location of the user. The further task consolidation can include adjustments to routes of the current task consolidation being executed, where the adjustments may take into account changes in traffic conditions, changes in weather conditions, and changes to parameters in the current task consolidation.

Elements associated with the architectures and methods, as taught herein, may communicate over a network. The network may include local-area networks (LAN), wide-area networks (WAN), wireless networks (e.g., a IEEE 802.11 wireless local area network or a cellular wireless wide area network), the Public Switched Telephone Network (PSTN) network, ad hoc and device-to-device (D2D) networks, personal area networks (e.g., Bluetooth) or other combinations or permutations of network protocols and network types. The networks may include a single local area network (LAN), a wide-area network (WAN), or combinations of LANs and/or WANs, such as the Internet. The various devices coupled to network may be coupled to the network via one or more wired or wireless connections.

Embodiments described herein may be implemented in one or a combination of hardware, firmware, and software. Embodiments may also be implemented as instructions stored on one or more machine-readable storage devices, which may be read and executed by at least one processor to perform the operations described herein. A machine-readable storage device may include any non-transitory mechanism for storing information in a form readable by a machine, for example, a computer. For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Components may be hardware, software, or firmware communicatively coupled to one or more processors in order to carry out the operations described herein. Components may be hardware components, and as such components may be considered tangible entities capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium.

In an example, the software, when executed by the underlying hardware of the component, causes the hardware to perform the specified operations. Accordingly, the term hardware component is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the modules need not be instantiated at any one moment in time. For example, where the components comprise a general-purpose hardware processor configured using software; the general-purpose hardware processor may be configured as respective different components at different times. Software may accordingly configure a hardware processor, for example, to constitute a particular component at one instance of time and to constitute a different component at a different instance of time. Components may also be software or firmware components, which operate to perform one or more methodologies described herein.

For example, a non-transitory machine-readable storage device can comprise instructions, which, when executed by a set of processors, cause a system to perform operations, the operations comprising operations to: identify a set of tasks of a user from a number of task sources, the task sources disposed in one or more devices of the user; for each task in the set, operations to: identify a location at which to accomplish the task; estimate a time to complete the task at the location; and compute a route to the location from a starting location or compute a route with respect to a route to another location of another task of the set of tasks. The operations can include operations to determine which tasks of the set of tasks are available for consolidation based on the identified locations, the estimated times, and the computed routes; generate a suggestion of a task consolidation from the determination of tasks available for consolidation; and send the suggestion to or within a device of the one or more devices of the user. The operations can include operations to perform features of method 100, methods similar to method 100, functions associated with architecture 400, or functions associated with architectures similar to architecture 400.

The operations to send the suggestion to or within the device can include operations to generate an alert in the device in real time in response to a task being created in the device or an associated device of the user, to generate a proposed itinerary for the task consolidation at a selected time prior to performance any of the tasks in the consolidation, or to generate an alert of the task consolidation en route to performance of one of the tasks of the consolidation. Itinerary calculation can include optimizing an objective function. Inter-task dependencies may be considered in the optimization. The operations can include operations to change a stored state of a task in the suggested task consolidation in response to an indication of acceptance of the suggestion and data indicating actions taken with respect to the suggested task consolidation.

In an embodiment, a user opens a to-do list via user interface 410 of a device of the user, where the device is in active operations with task manager 405, and enters an item into the to-do list in one of task sources 415-1 . . . 415-N. Task manager 405 analyzes the item by examining the manner in which the item has been expressed in the one task source of task sources 415-1 . . . 415-N. Task manager 405 may access one or more of data sources 425-1 . . . 425-M to acquire a history of other people's items to determine what kind of task is the currently entered tasked. An analysis can be conducted to determine what is entailed in the task. These analyzes can be conducted to determine whether the task is an errand, whether the tasks requires advance notice, whether the task is something that can be consolidated with other tasks on the to-do list or other items in a calendar of the user's device, or whether other information can be used to assist consolidation. The analysis can determine a timeline for that task such as, but not limited to, whether the entered task is something that needs to be performed today or whether it be performed a month from now. The task may be categorized with a level of urgency in a range of urgency.

Following the analysis of the task entered in the to-do list, a calendar in the device of the user in one or more of task sources 415-1 . . . 415-N can be accessed by task manager 405. The user's calendar can be examined by task manager 405 to find a good block of time where there is a meeting or appointment, whose location can be inferred or for which the location is known, for example, by the location being entered in the calendar with the meeting or appointment. Task manager 405 performs a search on the expression for the task using a search engine, where the search is a local search around the location of the meeting or appointment to determine whether there are businesses that can satisfy the task request in nearby locations to the meeting or appointment location. Based on this search, task manager 405 performs a route analysis of how long it would take to get to the task location, to the original destination location of the meeting or appointment, the distance between the two locations (task location and meeting or appointment location, the traffic conditions at that time of day, and so forth. A navigation application can be used to generate the route suggestion, which can also include time to leave information that provides how much time will occur to reach the destination. A history of map interactions of how long it actually takes people to get from point A to point B all over the city or all over the world using the navigation application at various times of the day can be built and stored in one or more of data sources 425-1 . . . 425-M prior to entering the current task.

Task manager 405 also performs an analysis as to when to alert the user. A basic undertaking includes determining whether to classifying the task as something where the user would need to know the night before, where the user could be notified at a short period of time prior to the start time of the consolidated tasks, or whether the user needs to be notified when the task is entered into the to-do list. The determination of the time to alert the individual can be based on understanding that the task involves other objects. For instance, if the task is to take clothes to the dry cleaner, the user can be prompted via user interface 410 as to whether the user wants to consolidate the task to the dry cleaner with a task to go to another location. If the user response is provided as an affirmative response via user interface 410, task manager 405 can set two reminders. One reminder would be an alert the night before the day to complete the consolidated tasks to remember the dry cleaning, and the other reminder would be the day for executing the consolidated tasks to remember the trip to the dry cleaner and that the user needs to leave now to accomplish the consolidated tasks. The alerts can include what needs to be performed with respect the task at the time of the alert. The task manager 405 can prompt the user with an alert at the time that the task is added to the to-do list. Task manager 405 does not need to examine the whole to-do list, since it performs these processes for the task being added one at a time.

Figure 5:
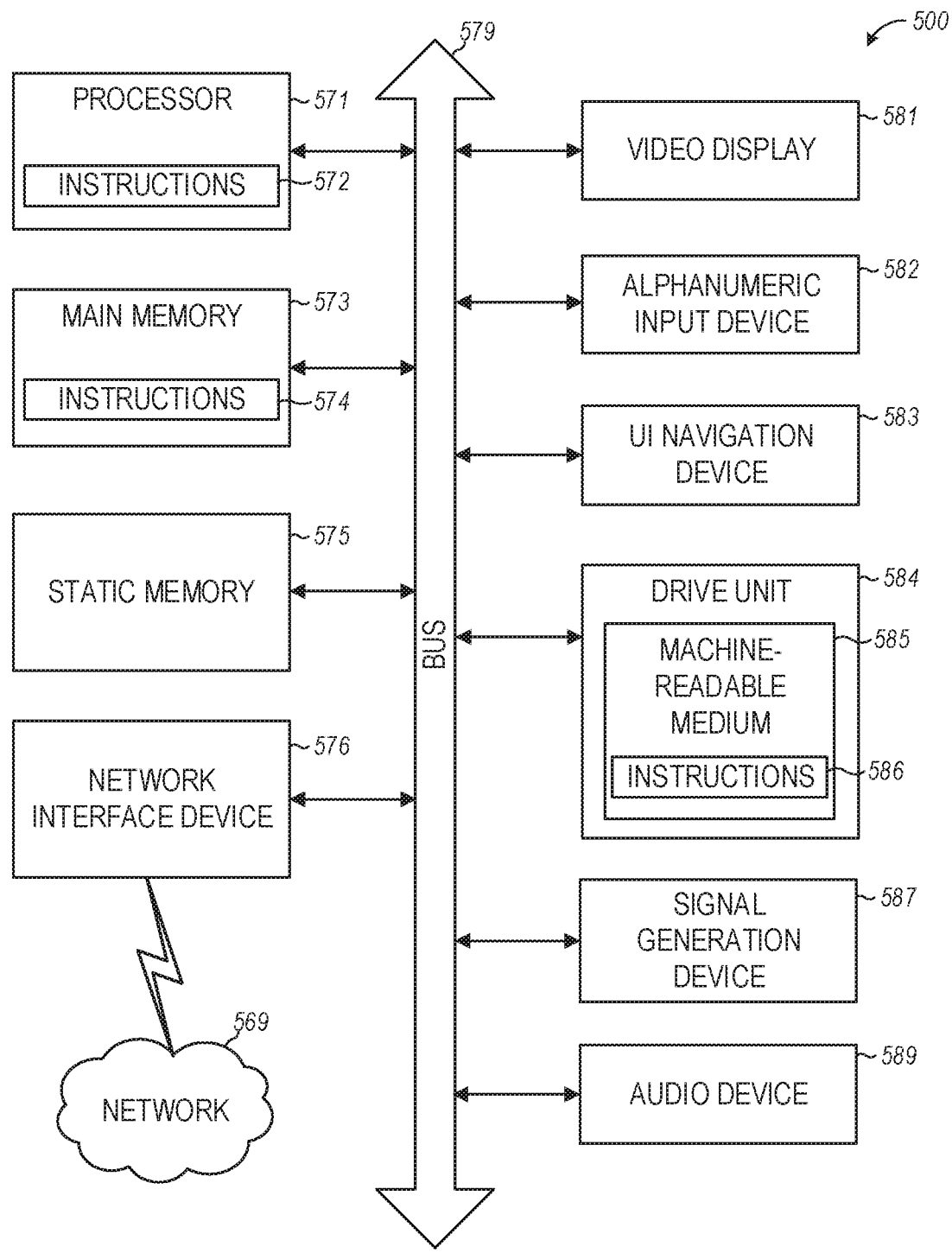
FIG. 5 is a block diagram illustrating features of an example system, in accordance with various embodiments.

FIG. 5 is a block diagram illustrating features of an embodiment of an example system 500, within which a set or sequence of instructions may be executed to cause the machine to perform any one of the methodologies discussed herein. System 500 represents one or more machines associated with location-based task suggestions for task consolidation, as taught herein. System 500 may be a machine that operates as a standalone device or may be networked to other machines, in a networked deployment, the system 500 may operate in the capacity of either a server or a client machine in server-client network environments, or it may act as a peer machine in peer-to-peer (or distributed) network environments. Further, while system 500 is shown only as a single machine, the term "system" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

System 500 can include one or more processors 571, a main memory 573 and a static memory 575, which communicate with each other via a link 579 (e.g., a bus). System 500 may further include a video display unit 581, an alphanumeric input device 582 (e.g., a keyboard), and a UI navigation device 583 (e.g., a mouse). Video display unit 581, alphanumeric input device 582, and UI navigation device 583 may be incorporated into a touch screen display. A UI of system 500 can be realized by a set of instructions that can be executed by processor 571 to control operation of video display unit 581, alphanumeric input device 582, and UT navigation device 583. The UI can be associated with a bot or a personal assistant.

System 500 may additionally include a storage device 584 (e.g., a drive unit), a signal generation device 587 (e.g., a speaker), a network interface device 576, and one or more sensors (not shown), such as a global positioning system (GPS) sensor, compass, accelerometer, or other sensor. System 500 may also include an audio device 589 having an audio input, such as for example a microphone, and an audio output, such as for example a speaker. Communications may be provided using link 579 in a wired transmission or a wireless transmission.

Storage device 584 can include a machine-readable medium 585 on which is stored one or more sets of data structures and instructions 586 (e.g., software) embodying or utilized by any one or more of the methodologies or functions described herein. The instructions 586 may also reside, completely or at least partially, within the main memory 573, static memory 575, and/or within the processors 571 during execution thereof by system 500, with main memory 573, static memory 575, and processors 571 also constituting machine-readable media. Components of an architecture to provide location-based task suggestions of task consolidation to or within a user device, as taught herein, can be distributed as modules having instructions in one or more of the machine-readable medium 585, main memory 573, static memory 575, and/or within the processors 571 during execution thereof by system 500.

While the machine-readable medium 585 is illustrated in an example embodiment to be a single medium, the term "machine-readable medium" may include a single medium or multiple media (e.g., a centralized or distributed database, and/or associated caches and servers) that store the one or more instructions 586. The term "machine-readable medium" shall also be taken to include any tangible medium that is capable of storing, encoding or carrying instructions for execution by the machine and that cause the machine to perform any one or more of the methodologies taught herein or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 586 may further be transmitted or received over a communications network 569 using a transmission medium via the network interface device 576 utilizing any one of a number of well-known transfer protocols (e.g., HTTP). In addition, communications network 569 may operably include a communication channel propagating messages between entities for which a correction and contradiction identification and notification procedure can be conducted. Examples of communication networks include a local area network (LAN), a wide area network (WAN), the Internet, mobile telephone networks, plain old telephone (POTS) networks, and wireless data networks (e.g., 3G, and 4G LTE/LTE-A or WiMAX networks). The term "transmission medium" shall be taken to include any medium that is capable of carrying signals containing instructions, the instructions for execution by the machine, and includes digital or analog communications signals.

In various embodiments, systems and methods of task consolidation can include identifying a business entity or other venue where an additional task can be accomplished, computing a route to the additional location, and computing the additional time needed adjacent to the original appointment, around which task consolidation is being constructed, based on additional travel time, task completion time, and other factors. The other factors can include such other factors as other events on the user's calendar, determination of when to alert the user to the opportunity to consolidate their tasks, time spent at additional venues, and other location-based activities, and user signals correlated to the tasks being evaluated. The systems and methods of task consolidation can include changing the state of pending tasks to completed, based on location tracking, and updating models of task completion time at the respective location given time spent there by the current user (personalization of the systems and methods), cohorts of users, or the general population of users.

Systems and methods, as taught herein, can be provided to support individuals that function in different environments by enhancing the capabilities of their devices. For example, an individual may operate in a standard work format, in a "gig economy" format, in a home-based format, or in other formats. In a standard work format, an individual typically is a full time worker at a work location, separate from a home location. In this format, tracking of a user and analyzing patterns of user interaction can include use of home locations and work locations around which task consolidation may be structured. In contrast, a gig economy is an environment in which temporary work positions are common such that organizations contract with independent workers for short-term engagements. In the gig economy, many individuals tend to be mobile with work performed from anywhere, which decouplers the individual's job from a job location. The systems and methods disclosed herein can use analysis of user patterns of interactions at various locations with analysis of the type of task to generate task consolidations based on current locations. For a home format in which home and work locations are the same, the system and methods can use this common location in analysis for task consolidations. The systems and methods, as taught herein, provide capabilities for electronic devices of users that assist the user to be more productive in various diverse environments.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A system comprising:
one or more processors;
one or more storage devices comprising instructions, which, when executed by the one or more processors, cause the system to perform operations to:
identify a set of tasks previously assigned to a user wherein the set of tasks includes a target task and a secondary task;
calculate a first time estimate to complete the secondary task at a secondary task location, using, at least in part, a user task-time completion data corresponding to the secondary task, wherein the first time estimate is associated with accomplishing the secondary task prior to accomplishing the target task;
calculate a second time estimate to complete the secondary task at the secondary task location, using at least in part, the user task-time completion data, wherein the second time estimate is associated with accomplishing the target task prior to accomplishing the secondary task;
determine that the target task and the secondary task can be consolidated based on comparing the first time estimate to the second time estimate;
generate either:
a first itinerary comprising a consolidation of the target task and the secondary task, the first itinerary corresponding to accomplishing the secondary task prior to accomplishing the target task; or
a second itinerary comprising the consolidation of the target task and the secondary task, the second itinerary corresponding to accomplishing the target task prior to accomplishing the secondary task;
send the first itinerary or the second itinerary to a device of the user and present the consolidation of the target task and the secondary task as a suggestion, wherein the suggestion is generated by a task manager that is trained to generate the first itinerary and the second itinerary based on historical data;
receive a response generated from the device of the user comprising an indication of either acceptance or rejection of the suggestion; and
further train the task manager that generates the first itinerary and the second itinerary to adjust at least one threshold used for generating the suggestion using data associated with a rejected suggestion.

2. The system of claim 1, further comprising:
selecting one of the set of tasks as the target task about which to determine which tasks of the set of tasks are available for consolidation; and
wherein identifying the secondary task location comprises determining the secondary task location is within a distance threshold, wherein the distance threshold is based on a pattern of the user performing the task within a distance range.

3. The system of claim 2, wherein the target task is selected as the target task based on the target task having a defined time for execution.

4. The system of claim 2, wherein operations to determine which tasks of the set of tasks are available for consolidation include operations to reject tasks having a sum of both the time estimate and a time to travel the computed route that is greater than a time estimate for the target task from a starting time, or operations to reject tasks having a total time to complete the tasks that is greater than a total time available on a calendar.

5. The system of claim 1, wherein the operations include operations to determine a time range during which to send the itinerary to the device.

6. The system of claim 5, wherein the operations to determine the time range include operations to determine characteristics of operations involved in tasks available for consolidation prior to beginning undertaking to accomplish the tasks in the consolidation, based on statistical data from historical data on the operations involved in tasks.

7. The system of claim 1, wherein the operations to send the itinerary to the device of the user include operations:
to generate an alert in the device in real time in response to a task being created in the device or an associated device of the user,
to generate the itinerary at a selected time prior to performance any of the tasks in the itinerary, or
to generate an alert of the task consolidation en route to performance of one of the tasks in the itinerary.

8. The system of claim 1, wherein the operations include operations to change a stored state of a task in the itinerary in response to an indication of acceptance of the itinerary and data indicating actions taken with respect to the itinerary.

9. The system of claim 1, wherein the operations to generate a suggestion of a task consolidation include operations to generate suggestions of multiple task consolidations and to prompt selection of at least one or none of the suggestions in a user interface of the device.

10. The system of claim 1, wherein the user task-time completion data comprises a padding time for the task, the padding time being based on historical data of the user completing the secondary task, and wherein calculating the time estimate further comprises adding the padding time to a time duration value based on a plurality of time duration values associated with a plurality of users completing the secondary task in an area including the secondary task location.

11. A processor implemented method comprising:
with one or more processors:
identifying a set of tasks previously assigned to a user that reside in a number of external task sources, each task source comprising a data store associated with a corresponding application used by the user;
identifying a target task and a secondary task from the set of tasks about which to determine which other tasks of the set of tasks are available for consolidation, based on the target task having a defined time for execution, wherein the target task is read from a first external task source and the secondary task is read from a second external task source;
calculating a first time estimate to complete the secondary task at a secondary task location using, at least in part, a location task-time completion data wherein the first time estimate is associated with accomplishing the secondary task prior to accomplishing the target task;
calculating a second time estimate to complete the secondary task at the secondary task location, using at least in part, the user task-time completion data, wherein the second time estimate is associated with accomplishing the target task prior to accomplishing the secondary task;
comparing the set of tasks to the secondary task to be accomplished based on the first time estimate and secondary task to be accomplished with the second time estimate;
determining, based on comparing the set of tasks to the secondary task to be accomplished with the first time estimate and secondary task to be accomplished with the second time estimate, that the target task and the secondary task can be consolidated, wherein the secondary task can be accomplished before the target task or the secondary task can be accomplished after the target task
generating a suggestion of a task consolidation corresponding to the first time estimate or the second time estimate, the task consolidation comprising a consolidation of the target task and the secondary task, wherein the suggestion is generated by a task manager that is trained to generate the suggestion based on historical data;
sending the suggestion to a device of the user and presenting the consolidation of the target task and the secondary task; and
receiving a response generated from the device of the user comprising an indication of either acceptance or rejection of the suggestion;
wherein data associated with a rejected suggestion is used for further training of the task manager to adjust at least one threshold used for generating the suggestion.

12. The processor implemented method of claim 11, further comprising receiving an indication via a presented user interface that the user:
rejects the entirety of the suggestion;
rejects certain tasks in the suggestion; or
requests a new suggestion be generated wherein identifying the set of tasks of the user includes identifying a target task about which to determine which tasks of the set of tasks are available for consolidation.

13. The processor implemented method of claim 12, wherein the suggestion is presented to the user via a user interface and the suggestion comprises an itinerary comprising for each task on the itinerary:
a leaving time;
a starting location;
a destination;
an estimated time of arrival; and
a task identifier.

14. The processor implemented method of claim 12, wherein identifying the set of tasks includes initially identifying the target task followed by identifying other tasks for the set and, for each of the other tasks of the set, identifying a location at which to accomplish each of the other tasks and computing the route to the location to accomplish each of the other tasks based on the target task.

15. The processor implemented method of claim 11, wherein the method includes determining a time range during which to send the suggestion of a task consolidation to the device.

16. The processor implemented method of claim 11, wherein sending the suggestion to the device of the user includes:
generating an alert in the device in real time in response to task being created in the device or an associated device of the user,
generating a proposed itinerary for a consolidation at a selected time prior to performing any of the tasks in the consolidation, or
generating an alert of the consolidation en route to performing one of the tasks of the consolidation.

17. The processor implemented method of claim 11, wherein the method includes changing a stored state of a task in the suggested task consolidation in response to an indication of acceptance of the suggestion and data indicating actions taken with respect to the suggested task consolidation.

18. A non-transitory machine-readable storage device comprising instructions, which when executed by a set of processors, cause a system to perform operations, the operations comprising operations to:
- identify a set of tasks previously assigned to a user and that reside in a number of applications used by the user, wherein the set of tasks includes a target task from a first external task source and a secondary task from a second external task source;
- calculate a first time estimate to complete the secondary task at a secondary task location using, at least in part, a user task-time completion data and a location task-time completion data corresponding to the secondary task, wherein the first time estimate is associated with accomplishing the secondary task prior to accomplishing the target task;
- calculate a second time estimate to complete the secondary task at the secondary task location, using at least in part, the user task-time completion data, wherein the second time estimate is associated with accomplishing the target task prior to accomplishing the secondary task;
- compare the set of tasks to the secondary task to be accomplished based on the first time estimate and secondary task to be accomplished with the second time estimate,
- based on comparing the set of tasks to the secondary task to be accomplished with the first time estimate and secondary task to be accomplished with the second time estimate, determine that the target task and the secondary task can be consolidated, wherein the secondary task can be accomplished before the target task or the secondary task can be accomplished after the target task;
- generate a suggestion of a task consolidation from the determination of consolidation, the task consolidation comprising a consolidation of the target task and the secondary task, wherein the suggestion is generated by a task manager that is trained to generate the suggestion based on historical data;
- send the suggestion to a device of the user and present the consolidation of the target task and the secondary task as a suggestion; and
- in response to the sent suggestion, receive an indication generated from the device of the user that the user has accepted or rejected the suggestion in whole or in part;
- using data associated with a rejected suggestion, further train the task manager to adjust at least one threshold used for generating the suggestion.

19. The machine-readable storage device of claim 18, wherein the operations to send the suggestion to the device of the user include operations to:
- generate an alert in the device in real time in response to a task being created in the device or an associated device of the user,
- generate a proposed itinerary for the task consolidation at a selected time prior to performance any of the tasks in the consolidation, or
- generate an alert of the task consolidation en route to performance of one of the tasks of the consolidation.

20. The machine-readable storage device of claim 18, wherein the operations include operations to change a stored state of a task in the suggested task consolidation in response to an indication of acceptance of the suggestion and data indicating actions taken with respect to the suggested task consolidation, and wherein the location task-time completion data comprises live information about the busyness of the secondary task location.

* * * * *